Oct. 20, 1970     T. A. ANASTASIO ET AL     3,535,564
ELECTRIC MOTOR AND HOUSING CLUTCH ASSEMBLY FOR USE IN HIGH VACUUM
Filed July 3, 1968     2 Sheets-Sheet 1
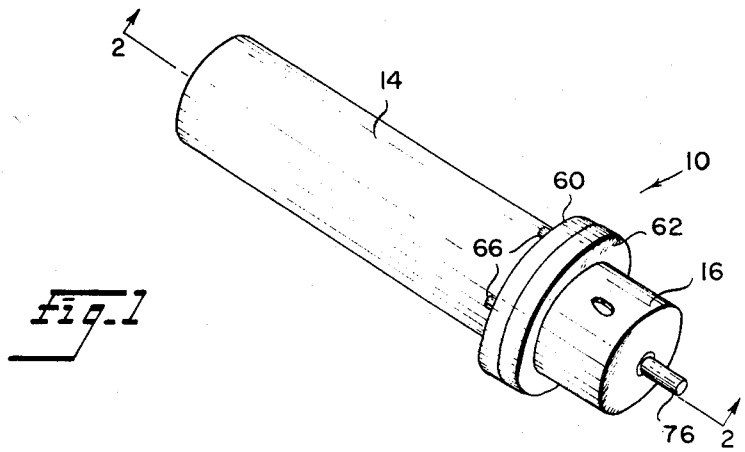
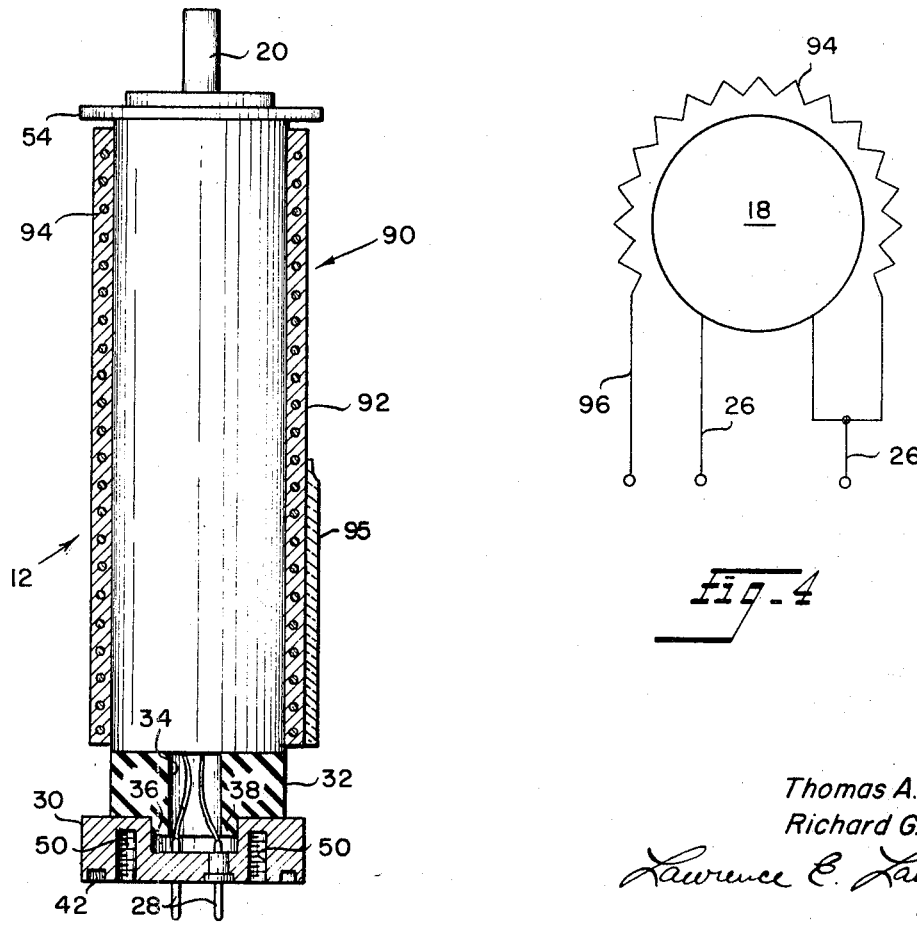
INVENTORS
Thomas A. Anastasio
Richard G. Pokorski
Lawrence E. Laubscher
ATTORNEY Oct. 20, 1970   T. A. ANASTASIO ET AL   3,535,564
ELECTRIC MOTOR AND HOUSING CLUTCH ASSEMBLY FOR USE IN HIGH VACUUM
Filed July 3, 1968                                2 Sheets-Sheet 2

INVENTORS
Thomas A. Anastasio
Richard G. Pokorski

Lawrence E. Laubscher
ATTORNEY

United States Patent Office 3,535,564
Patented Oct. 20, 1970

3,535,564
ELECTRIC MOTOR AND HOUSING-CLUTCH ASSEMBLY FOR USE IN HIGH VACUUM
Thomas A. Anastasio, Glen Burnie, and Richard G. Pokorski, Highland, Md., assignors to Dividean Incorporated, Severn, Md., a corporation of Maryland
Filed July 3, 1968, Ser. No. 742,397
Int. Cl. H02k 5/08, 5/12, 7/10
U.S. Cl. 310—42
10 Claims

ABSTRACT OF THE DISCLOSURE

An electric motor assembly for use in a high vacuum having a unitary power module including an electric motor encapsulated in a vacuum tight, sealed housing which is adapted to receive power modules of various sizes. The power module includes a semi-rigid couple of resilient material secured between the motor and a terminal plate for enclosing motor leads electrically connected to electrical terminals on said terminal plate and enhancing the seal between said housing and terminal plate. The end of the housing opposite the terminal plate is closed by a sealed end cap containing a magnetic clutch section which cooperates with a second magnetic clutch section on the electric motor shaft. An electric heater may be secured to the housing and covered with a layer of thermal insulation for operation of the assembly in low temperature environments.

---

This invention relates to dynamoelectric machine assemblies generally and more particular to a novel and improved hermetincally sealed dynamoelectric machine assembly for use in a high vacuum.

Certain environmental conditions preclude the effective use of conventional electric motors and require that the motor be sealed within a specially constructed casing. For example, motors subjected to high altitudes must be sealed, as evidenced by U.S. Pat. No. 2,595,349 to Kenneth H. Fox.

Also, an electric motor to be used in a high-vacuum chamber or other high vacuum environment must be effectively vacuum sealed so that the motor operates at substantially atmospheric pressure. Otherwise, the vacuum tends to cause complete deterioration and breakdown of the motor by attacking the motor coil insulation and physically evaporating the coils of the motor. Also, air trapped within the motor structure tends to contaminate the vacuum, while the friction between motor components is increased in a vacuum environment. These problems are recognized in a copending application Ser. No. 400,618 filed Sept. 30, 1964 in the name of Thomas A. Anastasio, now U.S. Pat. No. 3,400,286.

In prior sealed motor assemblies, the electric motor and a plurality of separate ancillary sealing and support components are assembled within a sealed housing. The need to position and assemble a plurality of components increases the motor assembly time required as well as the likelihood of erroneous assembly with subsequent motor malfunction. Also, ancillary components and often the staled motor housing must be varied in size to accommodate motors of varying sizes.

It is a primary object of the present invention to provide a novel and improved sealed dynamoelectric machine assembly which includes a unitary power module.

Another object of the present invention is to provide a novel and improved electric motor assembly for use in a high vacuum which includes a casing-unitary power module combination adapted to enable said casing to receive power modules of varying size.

A further object of this invention is to provide a novel and improved electric motor assembly for use in a high vacuum which includes a unitary power module having a semirigid couple secured between a terminal plate and an electric motor to maintain the integrity of the module and protect the motor power leads.

Another object of the present invention is to provide a novel and improved electric motor assembly for use in a high vacuum which includes a unitary power module including a semirigid couple between an electric motor and a terminal plate which operates to enhance a sealing relationship between the terminal plate and a sealed motor casing.

A still further object of the present invention is to provide a novel and improved sealed electric motor assembly which may be rapidly and economically assembled.

Other objects and advantages of the invention will become apparent from a study of the following specification when considered in conjunction with the accompanying drawing in which:

FIG. 1 is a perspective view of the electric motor assembly;

FIG. 3 is a longitudinal sectional view of an embodiment of the unitary power module; and FIG. 4 is a schematic diagram of the electrical circuit for the electric motor assembly.

Figure 2:
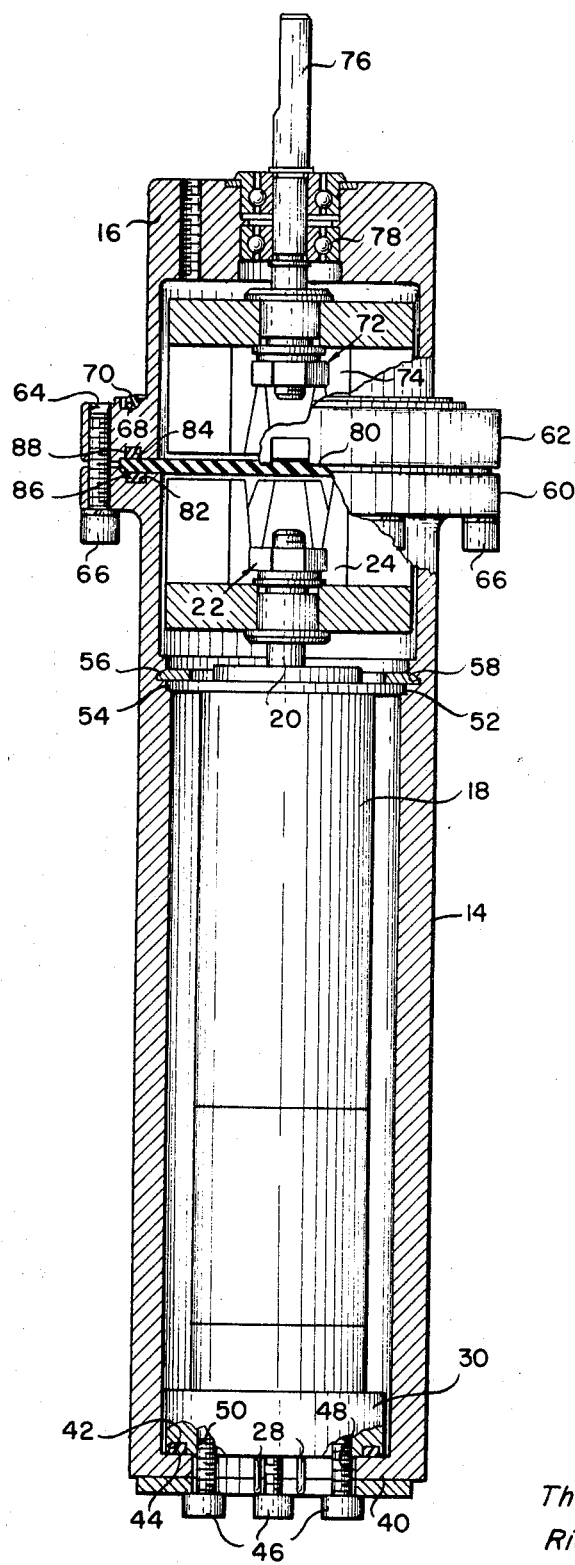
FIG. 2 is a partial longitudinal sectional view taken along lines 2—2 of FIG. 1.

Referring now to the drawings, the electric motor assembly indicated generally at 10 includes a unitary power module 12 and an open ended casing 14 adapted to telescopically receives the power module. One end of the casing is closed by a removable end cap 16.

The unitary power module 12 includes an electric motor 18 having a rotatable motor drive shaft 20 extending from one end thereof. A clutch section 22, which may constitute a magnetic clutch section having a plurality of poles 24, is secured to the motor drive shaft and is driven thereby.

The electric motor 18 is energized by means of electrical input leads 26 suitably connected between the motor and sealed power terminals 28 which extend through a terminal plate 30. The terminal plate is joined to the motor by an intervening semirigid coupling 32 formed of hard rubber or a similar hard but resilient material. The coupling may be bonded to the surfaces of the motor and terminal plate by a suitable adhesive, such as silicone rubber adhesive, or the coupling may be mechanically secured to both the motor and terminal plate.

The coupling 32 is designed to maintain the integrity of the power module 12 and to protect the electrical input leads 26 when the power module is separated from the casing 14 or is assembled therewith. The coupling includes a central bore 34 extending therethrough to receive and permit passage of the electrical input leads from the electric motor to the terminal plate.

The terminal plate 30 is intended to close and seal the remaining open end of the casing 14 opposite the end cap 16 when the power module 12 is received within the casing. For this purpose, the peripheral configuration and dimensions of the terminal plate conform substantially with the internal dimensions and configuration of the casing, with sufficient clearance being provided to permit insertion of the terminal plate into the casing.

The central area of the terminal plate surface adjacent the coupling 32 is cut away as illustrated at 36 in FIG. 3 to provide additional space for the terminal connections between the electrical leads 26 and the terminals 28. With the terminal plate so formed, the coupling is provided with an annular extension 38 that projects into the cutaway portion 36 when the power module is assembled.

The casing 14 is formed with an inwardly extending peripheral shoulder 40 adapted to contact and seat the terminal plate 30 when the power module 12 is inserted into position within the casing. The outer surface of the terminal plate is provided with an annular groove 42 which receives a sealing ring 44 which seals the terminal plate against the shoulder 40. This sealing ring is compressed by the coupling 32 in a manner to be subsequently described and assembly bolts 46 which extend through apertures 48 in the shoulder 40 and into threaded receiving apertures 50 in the terminal plate.

The internal surface of the casing 14 is provided with an annular seat 52 to receive a laterally projecting mounting flange 54 formed on the motor 18 adjacent the drive shaft 20. The mounting flange is locked into place by the spring action of a retaining ring 56 which is secured to the mounting flange and is adapted to snap into a locking groove 58 in the annular seat.

The casing 14 is provided with a laterally extending terminal flange 60 which is adapted to mate with a similar flange 62 on the end cap 16. These flanges are provided with aligned apertures 64 to receive joining bolts 66. The outer surface of the flange 62 is provided with an annular groove 68 containing a sealing ring 70 for sealing the flange against the surface of a vacuum chamber. This permits the motor assembly 10 to be secured to the wall of an evacuated chamber by means of bolts that extend through corresponding holes, not shown, contained in flange 62.

The end cap 16 contains a second clutch section 72 which cooperates with the clutch section 22. This second clutch section includes a plurality of magnetic pole pieces 74 which are mounted upon a rotatable shaft 76. This shaft extends outwardly from the end cap and is mounted for rotation by a bearing unit 78.

A seal plate 80 extends between the clutch sections 22 and 72 and is secured between the flanges 60 and 62. The inner surfaces of the flanges are provided with annular grooves 82 and 84 which receive sealing rings 86 and 88. These sealing rings provide a seal between the flanges and the sealing plate when the end cap 16 is secured to the casing 14.

For use in low temperature environments, it is often desirable to provide a cryogenic power module within the casing 14. This is accomplished by securing a heater 90 to the motor 18 by adhesive bonding or other suitable means (FIG. 3). This heater is formed by a mantle 92 of electrical insulating material which contains embedded electrical resistive heating elements 94. Preferably the mantel is surrounded by a layer of thermal insulation 95. Power for the heating elements is provided by a motor power lead 26, and a heater lead 96 (FIG. 4) is connected to a terminal 28 on the terminal plate 30.

In assembling the sealed motor assembly 10, the unitary power module 12 is inserted into the casing 14 until the terminal plate 30 rests upon the shoulder 40. The coupling 32 joined between the motor 18 and the terminal plate enables the terminal plate to be manipulated to align the apertures 48 and 50 and to position the motor without danger of injury to the power leads 26 or of upsetting the relationship between the power module components. The bolts 46 are then inserted and tightened to retain the power module and cause the sealing ring 44 to establish a vacuum tight seal between the terminal plate and the shoulder 40.

The coupling 32 is dimensioned so that it must be compressed before the mounting flange 54 seats in the annular seat 52 and the grip ring 56 can be snapped into the locking groove 58. The grip ring maintains the compression of the coupling which in turn presses against the terminal plate to enhance the seal provided by the sealing ring 44.

It will be noted that with the power module 12 in place, there is axial clearance between the end of motor 18 and the terminal plate 30, which clearance is filled by the resilient coupling layer 30. The casing is constructed to receive power modules of varying lengths which are adapted to seat within the casing by varying the thicknesses (i.e., axial dimensions) of the respective couplings 32.

With the power module secured within the casing, the end cap 16 is attached by means of the joining bolts 66 to cause the sealing rings 86 and 88 to provide a vacuum tight seal with the seal plate 80. The flanges 60 and 62 are bolted to the wall of an evacuated chamber by bolt means, not shown, and cause the sealing ring 70 to establish a vacuum tight seal between the flange 62 and the chamber wall.

While in accordance with the provisions of the Patent Statutes the preferred forms and embodiments of the invention have been illustrated and described, it will be apparent to those skilled in the art that changes may be made without deviating from the invention set forth in the following claims.

What is claimed is:

1. A hermetically sealed dynamoelectric machine assembly comprising in combination a power module including an electric motor, said electric motor having electric power leads extending therefrom, a terminal plate having an inner surface, an outer surface, and sealed electrical terminals extending between said surfaces, said electrical terminals being electrically connected to said electric power leads, and a semi-rigid coupling of resilient material positioned between said electric motor and the inner surface of said terminal plate and secured thereto to form a unitary modular unit, said coupling having a central bore extending therethrough to provide access to said electrical terminals for said electric power leads, an open ended casing adapted to telescopically receive said power module, one end of said casing being closed by said terminal plate upon receipt of said power module, an end cap assembly for closing the remaining end of said casing, and sealing means to hermetically seal said end cap assembly and terminal plate to said casing.

2. The hermetically sealed dynamoelectric machine assembly of claim 1 wherein said casing includes an inwardly extending peripheral shoulder formed adjacent one open end thereof to seat said terminal plate, the outer surface of said terminal plate including a peripherally extending groove formed therein adjacent the periphery of said plate, and a sealing gasket mounted in said groove to form a hermetic seal between the outer surface of said terminal plate and said inwardly extending peripheral shoulder.

3. The hermetically sealed dynamoelectric machine assembly of claim 1 wherein said power module includes an electric heating unit secured to the outer surface of said electric motor, said heating unit including a layer of electrical insulating material, a heating element covered by said insulating material, and a power lead connected between said heating element and at least one of said electrical terminals on said terminal plate.

4. The hermetically sealed dynamoelectric machine assembly of claim 2 wherein said semi-rigid coupling is formed to a thickness whereby said couple is compressed to apply force to said terminal plate when the power module is mounted within said casing.

5. The hermetically sealed dynamoelectric machine of claim 1 wherein said electric motor includes a motor drive shaft extending therefrom in spaced, opposed relationship to said terminal plate and a first magnetic clutch section mounted upon said drive shaft, said end cap assembly including a housing defining an inner chamber, a shaft journaled for rotation in said housing and extending therethrough from said inner chamber outwardly of one end of said cap assembly, the central longitudinal axis of said shaft being substantially aligned with the central longitudinal axis of said motor drive shaft when said end cap assembly is positioned to close the end of said casing, and a second magnetic clutch section mounted upon said shaft within said inner chamber in spaced, opposed relationship to said first magnetic clutch section.

6. The hermetically sealed dynamoelectric machine of claim 5 wherein said casing is provided with an outwardly extending peripheral flange at the end thereof closed by said end cap assembly, said flange being provided with spaced openings extending therethrough for the reception of end cap assembly securing means, said end cap assembly housing being provided with a corresponding outwardly extending peripheral flange at the end thereof opposite said outwardly extending shaft, said end cap assembly flange being provided with openings extending therethrough and positioned for alignment with the openings in said casing flange.

7. The hermetically sealed dynamoelectric machine of claim 6 wherein said end cap assembly includes a sealing plate adapted to extend across the open end of said casing, said sealing plate being sealed between said casing and end cap assembly flanges when said end cap assembly is secured to said casing.

8. The hermetically sealed dynamoelectric machine of claim 6 wherein said terminal plate is provided with threaded bolt receiving openings extending inwardly from the outer surface thereof, said bolt receiving openings being positioned inwardly of said peripherally extending groove, and said casing shoulder is provided with bolt receiving openings extending therethrough and positioned for alignment with corresponding threaded openings in said terminal plate.

9. The hermetically sealed dynamoelectric machine of claim 6 wherein the surface of said end cap assembly flange opposite the flange surface adapted to mate with said casing flange contains at least one peripherally extending groove seat, and further including sealing gasket seated within said groove seat.

10. Apparatus as defined in claim 3, and further including a layer of thermal insulation material enclosing said layer of electrical insulating material and said heating element.

References Cited
UNITED STATES PATENTS

| | | | |
|---|---|---|---|
| 2,230,581 | 2/1941 | Avigdor | 310—88 |
| 2,452,248 | 10/1948 | Lee | 310—88 |
| 2,595,449 | 5/1952 | Fox | 310—89 |
| 2,885,962 | 5/1959 | Campbell | 310—88 X |
| 3,074,347 | 1/1963 | Clymer | 103—87 |
| 3,198,975 | 8/1965 | Fisher | 310—105 |

WARREN E. RAY, Primary Examiner

U.S. Cl. X.R.

310—10, 71, 72, 78, 88, 89, 104